Feb. 11, 1969
H. W. SCHARER
3,426,610
LOCKING DEVICE FOR ADJUSTABLE GEARING
Filed April 25, 1967
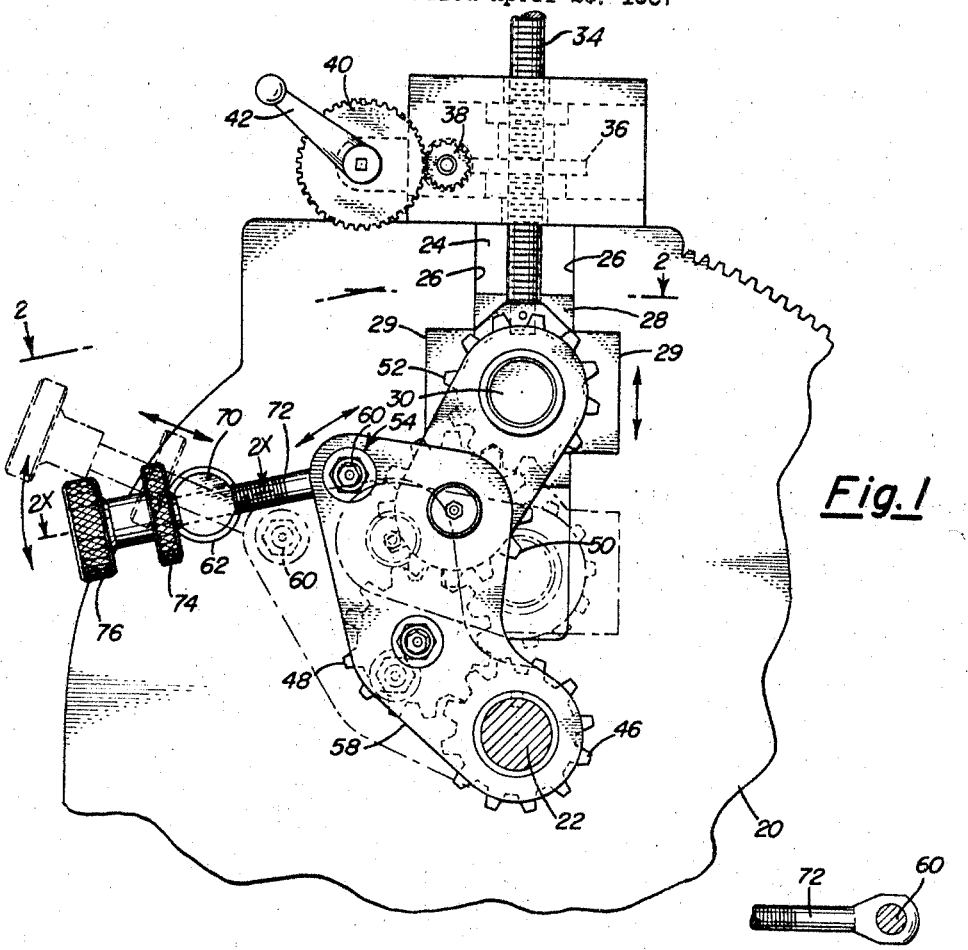
Fig.1
Fig.3
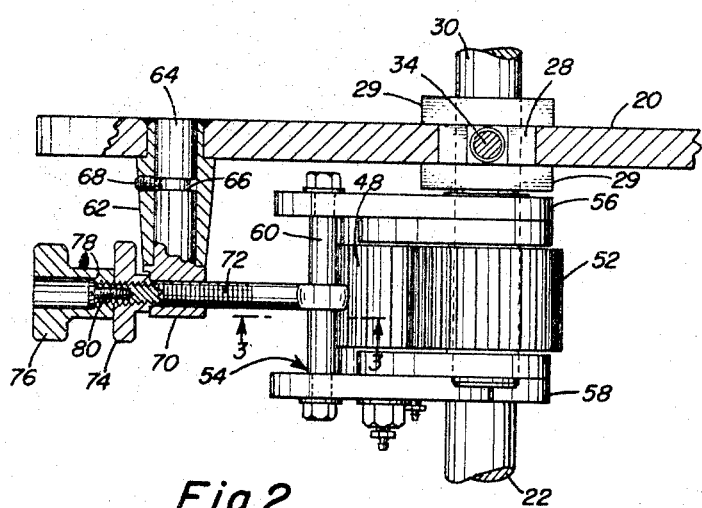
Fig.2
INVENTOR.
HERMAN W. SCHARER
BY
ATTORNEYS 3,426,610
LOCKING DEVICE FOR ADJUSTABLE GEARING
Herman W. Scharer, Spring Valley, Calif., assignor to
  Neville T. Henkel, El Cajon, Calif.
Filed Apr. 25, 1967, Ser. No. 633,619
U.S. Cl. 74—397                                3 Claims
Int. Cl. F16h 35/00

ABSTRACT OF THE DISCLOSURE

A locking device for retaining a gearing carrying lever in adjusted position with the gear in meshing relationship with a drive shaft and a driven shaft, one of which shafts being translatably movable relative to the other.

*Summary of the invention*

The present invention is directed to locking gearing in selected adjusted position, which gearing is interposed between a drive shaft and a driven shaft, the latter being translatable, e.g., bodily shiftable relative to the drive shaft.

Specifically, the driven shaft must be translatable relative to the drive shaft to suit different conditions which are to be performed by the driven shaft. Therefore, a lever is pivotally mounted on the same axis as the drive shaft and it carries gearing in driving relationship between the drive and driven shafts. The lever is movable about its pivotal support for varying the distance between the drive and driven shafts.

Torque reaction takes place between the shafts when a load is impressed on the driven shaft, which reaction tends to move the lever about its pivotal support. Novel locking mechanism of the present invention locks the lever in adjusted position to prevent relative movement, due to torque reaction, of the shafts.

Other features and the advantages of the present invention will be apparent from the following description, reference being had to the accompanying drawing wherein a preferred embodiment of the invention is illustrated.

In the drawing:

FIG. 1 is a fragmentary side view of a frame showing the drive and driven shafts, the lever and the locking mechanism carried by the frame;

FIG. 2 is a fragmentary view looking in the direction of line 2—2 of FIG. 1, showing part of the frame in section, part of the view being also shown in section, the latter section being taken along line 2X—2X of FIG. 1; and FIG. 3 is a fragmentary sectional view taken along line 3—3 of FIG. 2.

Referring more in detail to the drawing, the support frame 20 rotatably carries a drive shaft 22. The frame is provided with an open top slot 24, the side walls 26 which form the slot, provide vertical extending guides for a block 28. The block 28 also includes flanges 29 on opposite sides of frame 20. These flanges are adapted to engage the opposite side walls of the frame for stabilizing the block. Block 28 rotatably carries a driven shaft 30. The block and shaft 30 are movable vertically, i.e., translatable relative to drive shaft 22. The block and driven shaft 30 are moved vertically by any suitable mechanism herein shown as a screw 34 which is moved vertically through a gear 36 threaded thereon and turned by gears 38 and 40. Gear 40 is rotated by a handle 42.

Gearing in the form of gears 46, 48, 50 and 52 interconnect the drive shaft 22 and the driven shaft 30; gear 46 being affixed to shaft 22 and gear 52 being affixed to shaft 30. A lever 54 is pivotally mounted on the shaft 22 and rotatably carries gears 48 and 50. Gear 48 meshes with gears 46 and 50, and gear 50 meshes with gear 52.

The axes of the gears and shafts therefor are parallely aligned. As shown, lever 54 includes two parallel sections 56 and 58. A rod 60 is fixed to both sections.

A support 62 is carried by the frame 20 forming a bearing for a shaft 64, the axis of which lies parallelly with the axes of the drive shaft 22 and the driven shaft 30. The shaft 64 is provided with a circular groove 66 which receives a shaft retaining screw 68. The forward end or head 70 of the shaft 64 is bored at right angles to the axis of that shaft for receiving an arm 72, the right end thereof being pivotally attached to the rod 60 on the lever 54. The arm 72 is threaded for receiving and adjusting nut 74 which bears against the left side of head 70 of shaft 64 and for receiving a lock nut 76.

The torque reaction between the drive shaft 22 and the driven shaft 30 tends to rotate the lever 54 in a clockwise direction as viewed in FIG. 1, however, such movement is prevented by the engagement of the adjusting nut 74 against the head 70 of shaft 64.

The shaft 30 and gear 52 can be moved from the full line position shown in FIG. 1, to lower selected positions by turning the adjusting nut 74 to permit arm 72 and lever 54 to be moved counterclockwise, one counterclockwise position being shown in dotted lines in FIG. 1. After lowering the shaft 30 to the desired position, the arm is locked in position by lock nut 76. The lock nut is bored to provide a shoulder 78. The shank of a screw 80 extends through the lock nut and is threaded into the end of arm 72. The head of the screw prevents accidental removal of the lock nut from the arm 72.

I claim:
1. A combination including:
  (A) a frame;
  (B) a drive shaft rotatably carried by the frame;
  (C) a driven shaft;
  (D) means supporting the driven shaft by the frame for translatable movement relative to the drive shaft, the axis thereof lying parallelly to the axis of the drive shaft;
  (E) a lever, said lever being supported for pivotal movement on an axis aligned with the axis of the drive shaft;
  (F) gearing rotatably supported on the lever, the axes lying parallelly of the axes of the drive and driven shafts;
  (G) means on the frame for moving the lever about its pivot axis;
  (H) means supporting the last mentioned means (G) on the frame;
  (I) and a lock for locking the lever in position.
2. A combination as defined in claim 1, characterized in that the means (G) for moving the lever includes a screw and that the lock (I) is a lock nut in threaded engagement with the screw.
3. A combination as defined in claim 2, characterized in that the means (H) includes:
  (H) (1) a shaft rotatably supported by the frame; and further characterized in that the screw is in threaded engagement with the last mentioned shaft (H) (1).

References Cited

UNITED STATES PATENTS

| | | | |
|---|---|---|---|
| 2,490,970 | 12/1949 | Krassilnikian et al. | |
| 2,567,997 | 9/1951 | Granberg | 74—397 X |
| 2,594,692 | 4/1952 | Skillman | 74—397 |
| 2,640,371 | 6/1953 | Rosenleaf | 74—397 |

DONLEY J. STOCKING, *Primary Examiner.*

LEONARD H. GERIN, *Assistant Examiner.*